United States Patent [19]
Jannard et al.

[11] Patent Number: 5,137,342
[45] Date of Patent: * Aug. 11, 1992

[54] EYEWEAR TRACTION DEVICE

[75] Inventors: James H. Jannard, San Juan Capistrano; Gregory F. Arnette, South Laguna Beach, both of Calif.

[73] Assignee: Oakley, Inc., Irvine, Calif.

[*] Notice: The portion of the term of this patent subsequent to Oct. 8, 2008 has been disclaimed.

[21] Appl. No.: 695,683

[22] Filed: May 3, 1991

Related U.S. Application Data

[63] Continuation of Ser. No. 436,474, Nov. 20, 1989, Pat. No. 5,054,903.

[51] Int. Cl.$^5$ .................................. G02S 5/14
[52] U.S. Cl. ..................... 351/123; 351/122; 351/111
[58] Field of Search ............... 351/122, 123, 111, 119, 351/121

[56] References Cited

U.S. PATENT DOCUMENTS

| | | |
|---|---|---|
| 2,031,771 | 2/1935 | Grier .................................. 351/123 |
| 2,561,402 | 7/1951 | Nelson . |
| 2,949,638 | 8/1960 | Butler . |
| 3,684,356 | 8/1972 | Bates . |
| 3,741,635 | 6/1973 | Wortman . |
| 4,074,932 | 2/1978 | Thill .................................. 351/123 |
| 4,563,066 | 1/1986 | Bononi . |
| 4,662,729 | 5/1987 | Dobson . |
| 4,732,465 | 3/1988 | Field . |
| 4,786,158 | 11/1988 | Barfus-Shanks . |

FOREIGN PATENT DOCUMENTS 62-12123  1/1987  Japan .

*Primary Examiner*—Paul M. Dzierzynski
*Attorney, Agent, or Firm*—Knobbe, Martens, Olson & Bear

[57] ABSTRACT

In eyewear employing temples, a substantially cylindrical elastomeric traction member is disposed in a recessed seat which extends along a length of each temple to provide a contact area between the temple and the head. The traction member and seat may be sized so that the traction member is substantially flush with the adjacent temple or alternatively, the traction member may extend beyond the periphery of the temple. In either configuration, the traction device extends substantially parallel to the length of the temple.

32 Claims, 1 Drawing Sheet

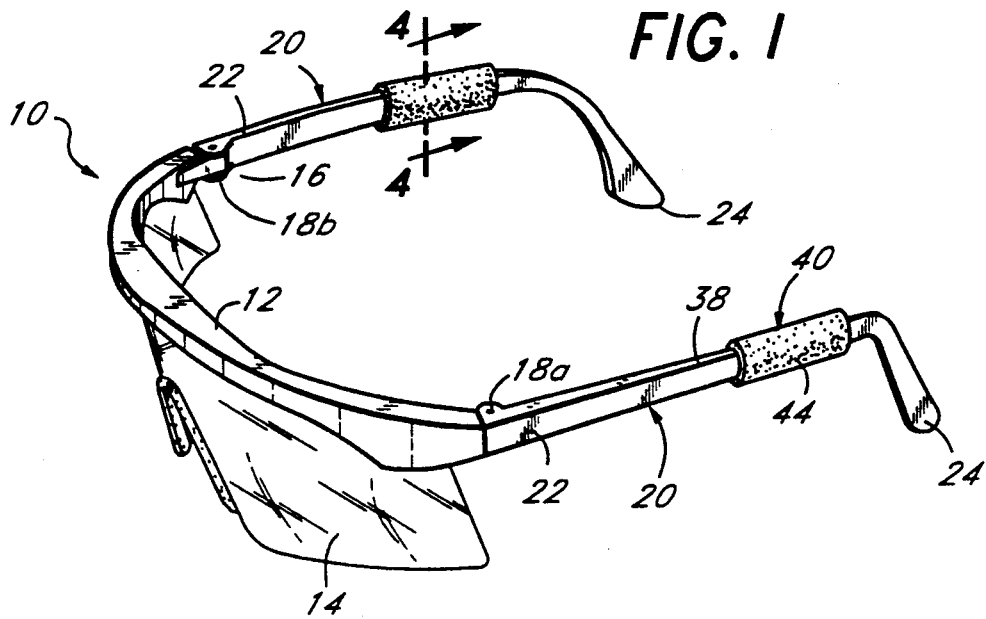
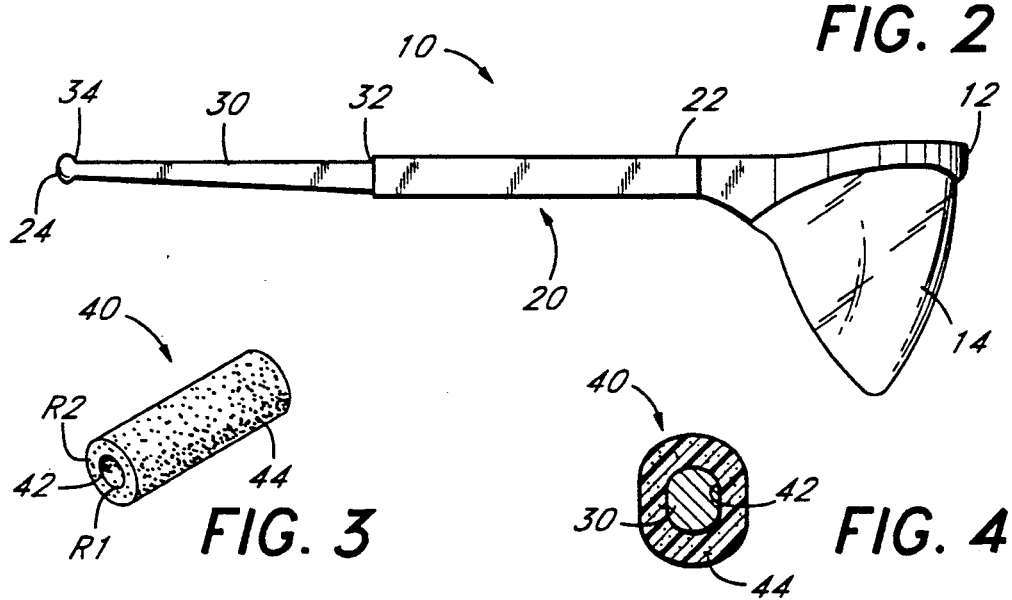
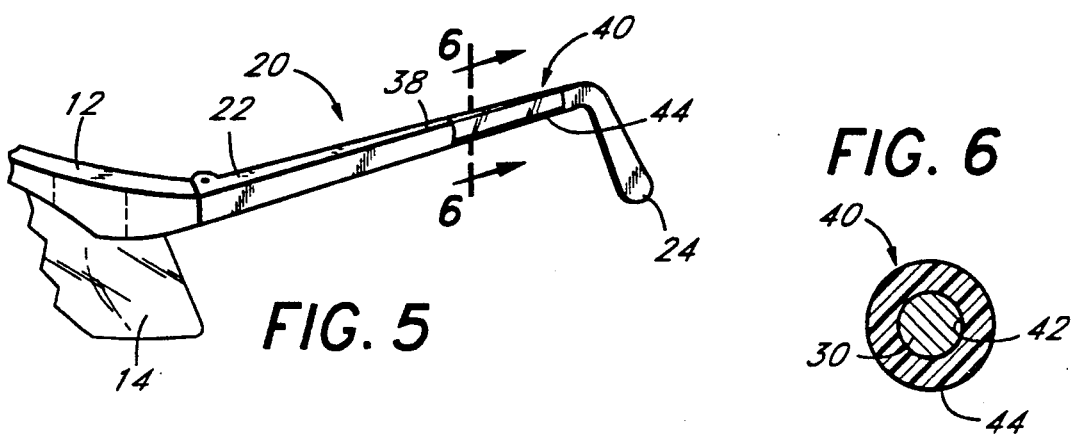

EYEWEAR TRACTION DEVICE

This application is a continuation of application Ser. No. 436,474 filed Nov. 20, 1989, now U.S. Pat. No. 5,054,90.

BACKGROUND OF THE INVENTION

The present invention relates to eyewear and, more particularly, to a selectively attachable traction device for improving the retention of the eyewear about the head and a method for using the same.

While corrective lenses are specifically crafted to accommodate the unique vision defects of an individual, the frames used to retain the lenses are typically a standard size and not crafted to conform to the particular contours of an individual's head. Lenses which are employed in filtering eyewear such as sunglasses are also typically retained in stock frames. However, it is virtually impossible to mass produce stock frames which fit every individual's head; therefore, stock frames are constructed to conform to an idealized "standard" adult head.

As a result, such frames often result in a fit which is either too tight or too loose about the head of an individual. A tight fitting frame may cause localized pain and headaches, while a loose fitting frame may allow the eyewear to fall from the head and damage the frame or the lens. This is particularly disadvantageous for protective eyewear such as sunglasses which are to be used in active sports, such as bicycle racing or skiing. Additionally, in the event that corrective lenses vary in weight between the lenses, the uneven weight distribution may cause frames to locally abrade the skin.

A variety of means have been employed to improve the securing of eyewear to the head. These devices have included the use of loose strings which connect the temples of the eyewear around the back of the wearer's head, thereby preventing the glasses from becoming completely displaced from the body. Alternatively, an elastic strap connecting the temples has been employed to engage the wearer's head and secure the eyewear in the desired position.

Perhaps most frequently used, temples have been provided with a hook at the posterior end for engaging the wearer behind the ears. However, due to the significant variation among individuals in the distance from the appropriate position of an eyeglass lens and the back of the ear, the traditional ear hook is frequently either too far back or too far forward of the appropriate position on the wearer's ear. This causes either a painful or irritating friction if the hook is too far forward, or a loose fit if too far back.

The prior attempts to improve the retention of eyewear about the wearer's head have also included the use of rubber or rubber-like plastic boots applied to the free ends of the temples for increasing the friction between the eyeglasses and the head, such as shown in Bates U.S. Pat. No. 3,684,356. The Bates device, however, appears somewhat clumsy and awkward and, therefore, detracts from the appearance of the eyewear. In addition, the Bates device is limited in that it may not be adjusted relative to the eyewear; that is, the closed end of the boot prevents forward adjustment to a more anterior point of contact between the temples and the head, while an unsupported length of boot extending beyond the earpiece is undesirable.

Another prior attempt to improve eyewear retention is disclosed in the Nelson patent (U.S. Pat. No. 2,561,402), which discloses use of relatively complicated fluid chambers at the interface of the free end of the temples and the head. Nelson uses the fluid chambers in an effort to evenly distribute pressure between the temple and the head. As the fluid chambers of Nelson are permanently affixed to the temple in a predetermined orientation, modification for specific individuals is unavailable. In addition, the fluid retained within the chambers adds an undesired weight to the eyewear. Further, even if the fluid chambers were removable, such removal would substantially alter the fit of the eyewear, rendering the eyewear substantially unwearable.

Notwithstanding the foregoing, there remains a need for providing a means of improving the compatibility of eyewear and the wearer so as to improve retention of the eyewear. Preferably, the eyewear retention means will enable one size to comfortably and securely fit a much larger population than can one size eyewear having the traditional ear hook.

A need also exists for a device which improves retention of eyewear without permanently altering the configuration of the eyewear. A further need exists for a retaining device which may be easily disengaged or recombined with the eyewear without drastically changing the functioning or the appearance of the eyewear. In addition to the functional requirements of the traction device, an aesthetic requirement exists so that the device may be employed as a portion of eye wear in either an unobtrusive or distinctive, but attractive, mode.

SUMMARY OF THE INVENTION

There is provided in accordance with one aspect of the present invention an improved eyewear temple of the type for retaining a pair of eyeglasses on the head of the wearer, by extending from the eyeglass frame in a posterior, i.e., distal, direction over the top of the ears of the wearer. The improved eyeglass temple of the present invention permits the elimination of the traditional hook on the posterior end of traditional temples, and allows a single size set of eyewear temples to comfortably and securely fit on a broader cross section of anatomical variations.

The eyeglass temple comprises an elongate eyeglass temple body, having a first proximal end for attaching the temple to the frame of the eyeglasses, and a second end, distal from the first end, for engaging the head of the wearer. Optionally, the first end of the temple is adapted for securing directly to the lens, such as in a single lens eyeglass system. Preferably, the first end on the temple is provided with a means for releasably pivotably engaging the eyeglass lens or eyeglass frame.

A recessed seat is disposed on the elongate temple body, in between the first and second ends, the recessed seat having a smaller cross-sectional area than the cross-sectional area of the temple body adjacent to the seat. Preferably, the recessed seat comprises an annular recess having first and second shoulders at the first and second axial ends thereof. Preferably, the axial length of the annular recess is less than about one-half of the axial length of the temple, and most preferably, less than about one-third the axial length of the temple.

The eyeglass temple is preferably additionally provided with at least one tubular traction member disposed within the recessed seat. The traction member preferably comprises an elastomeric material which enables radial expansion to fit over the distal end of the temple body, and relaxation back to provide a snug fit within the recess on the temple. The traction member is preferably made from an elastomeric material which exhibits improved retention properties when the material is wet, and, most preferably, the exterior surface of the traction member is provided with friction enhancing structures, such as annular ridges or other patterned textures.

There is provided in accordance with another aspect of the present invention, an improved eyeglass having at least one lens, and a frame for supporting the lens in front of the eyes of the wearer. The eyeglass is further provided with a first and a second temple produced in accordance with the present invention. Preferably, the distal end of the temple is substantially straight, so that the temple does not wrap around behind the ear of the wearer.

Further features and advantages of the present invention will become apparent from the detailed description of preferred embodiments which follow, when taken together with the appended figures and claims.

BRIEF DESCRIPTION OF THE DRAWINGS

FIG. 1 is a perspective view of eyewear in accordance with one embodiment of the present invention.

FIG. 2 is a side elevational view of a second embodiment of eyewear in accordance with the present invention, with the traction member removed.

FIG. 3 is a perspective view of a traction member in accordance with the present invention.

FIG. 4 is a cross-sectional view taken along line 4—4 of FIG. 1.

FIG. 5 is a perspective view showing an alternative embodiment of the traction member.

FIG. 6 is a cross-sectional view taken along line 6—6 of FIG. 5.

DETAILED DESCRIPTION OF THE PREFERRED EMBODIMENT

As used in the present application, "eyewear" is a general term intended to embrace optical devices containing corrective lenses for defects in vision or lenses for such special purposes as filters for absorbing or blocking portions of the electromagnetic spectrum, providing physical shields for the eyes or making available other physical or optical functions for protective or visual assisting purposes.

As shown in FIG. 1, eyewear 10 adapted to position a lens in a predetermined orientation relative to the eyes includes a frame 12, lens 14 and temples 20. Preferably, the lens 14 is joined to the frame 12 so as to position the lens 14 before the eyes. As shown in FIGS. 1, 2 and 6, the temples 20 may be pivotally affixed or joined to the frame 12. Although the temples 20 are shown in FIG. 1 as pivotally affixed to the frame 12, the temples 20 may be permanently attached in a predetermined orientation or selectively engageable with the frame 12 without circumventing the scope of the present invention. Alternatively, the frame 12 may be eliminated entirely by securing the temples 20 with or without temple hinges directly to the lens 14 by thermoplastic bonding, adhesives screws or other known fastening means which are suitable for the material of the lens and temples.

As is well known in the art, the frame 12 and temples 20 may be conveniently made of molded plastic or a variety of other materials. The lens 14 may take any of a number of configurations and may be formed of sheet plastic, molded plastic or glass as determined by the application of the lens.

Each temple 20 is defined by a proximal end 22 and a distal end 24 wherein the proximal end 22 is affixed either permanently or detachably to the frame 12. The permanent attachment of the temples to the frame 12 may be accomplished through molding or thermoplastic bonding. The detachable engagement of the temples 20 and the frame 12 is provided by the use of a snap fit or fasteners including screws or pins, as are known in the art.

Although the earstems shown in FIG. 1 are affixed to the frame 12, the earstem 20 may be attached directly to the lens 14. Preferably, the earstems 20 are hingeably attached to the frame 12 or lens 14 and most preferably, hingeably and removably attached, as well known in the art.

As shown in FIG. 1, in a typical hingeable connection, the frame 12 or lens 14 includes a hinge aperture (not illustrated) extending through a protruding flange 16. The earstem 20 includes a pair of parallel apertured flanges 18a, 18b spaced so as to receive the flange 16 of the frame 12 or lens 14 therebetween. The apertures in the earstem 20 are aligned with the apertures of the frame 12 or lens 14 and a pin is inserted so as to permit rotation of the frame 12 or lens 14 relative to the earstem 20, thereby providing a hingeable connection. In a typically readily detachable hinge, the aperture in the flange 16 of the frame 12 or lens 14 is replaced by an integral pin (not illustrated) which extends away from the flange 16 in opposite directions along the same axis as the aperture. The pinned flange 16 is inserted by deformation between the opposing flanges 18a, 18b and the integral pin snaps into the aperture on the flanges 18a, 18b, thereby providing a readily detachable hinge.

As shown in FIGS. 1 and 5, the distal end 24 may be curved so as to provide loops which are disposed behind the ears when the eyewear is worn. However, as the looped temples shown in FIGS. 1 and 5 may impinge upon the head in undesired locations when employed on heads of different sizes, the looped temples are not well suited to accommodate a wide variety of head sizes. Thus, the preferred embodiment shown in FIG. 2 includes a straight temple which, when used in conjunction with the present invention, provides more universally fitting eyewear and eliminates the traditional ear hook which can cause discomfort or distraction for many wearers.

As shown in FIG. 2, a recessed seat 30 is disposed intermediate of the proximal and distal ends 22, 24. As shown in FIG. 2, the seat 30 is preferably located adjacent the distal end 24 of the temple 20, so that the posterior shoulder 34 is substantially coincident with the distal end 24. However, as will be apparent, if it is desired to extend the temples in a posterior direction beyond the ears, the distance between posterior shoulder 34 and distal end 24 can be proportionately increased to maintain seat 30 near the ear.

The recessed seat 30 is defined by posterior shoulder 34 and preferably an anterior shoulder 32, such that the anterior shoulder 32 is disposed between the posterior shoulder 34 and the proximal end 22. Preferably the cross-sectional dimension of the seat 30 between the anterior and posterior shoulders 32, 34 is smaller than the cross-sectional dimension of the adjacent temple 20.

Preferably, the posterior should 34 is a sufficient distance from the anterior shoulder 32 so that at least one traction member 40 may be retained therebetween. However, the seat 30 may be configured so as to extend substantially the entire length of the temple or alternatively, may extend only a portion of the overall length of the temple. Typically, the seat extends less than about one-half or one-third the length of the temple and is disposed on the posterior portion of the temple.

Although the seat is shown as defined by an anterior shoulder 32 and a posterior shoulder 34, the present invention may be practiced with a seat 30 defined only by a posterior shoulder 34 for preventing unintended axial displacement of the traction member in the posterior direction.

When the seat 30 is defined by only the posterior shoulder 34, the cross-sectional area of the seat may taper from being substantially coincident with an anterior cross-sectional area of the temple to the reduced cross-sectional area at the posterior shoulder 34. The posterior shoulder thereby prevents unintentional axial displacement of the traction member in the posterior direction. Axial displacement of the traction member in the anterior direction is inhibited by the expanding cross-sectional area of the seat in a tapered embodiment, as the seat extends in the anterior direction, or simply by a friction fit in the absence of a taper or an anterior shoulder.

Preferably, the seat 30 is located so that upon operable engagement of the traction member 40 within the seat 30, the traction member 40 provides an interface between the eyewear and the head. That is, the traction member 40 contacts the head.

Referring to FIG. 3, an elongate tubular traction member 40 is shown. In the preferred embodiment, the traction member 40 is formed substantially in the shape of a hollow cylinder having an inner surface 42 of radius R1 and outer surface 44 of radius R2, wherein radius R1 is less than radius R2. Preferably, radius R1 is expandable to permit passage of the distal end 24 of the temple 20 through the interior of the traction member 40 without exceeding the elastic limits of deformation of the traction member 40.

As shown in FIG. 4, the traction member 40 is preferably comprised of a material having sufficient elasticity that the inner surface 42 of the traction member 40 snugly contacts the surface of a seat 30 having an oblong or rectangular cross-section with a cross-sectional area greater than that of R1 in the unexpanded state. Referring to FIG. 6, the inner surface 42 will also preferably conform snugly to the surface of a seat 30 having a substantially circular cross-section.

Other embodiments of the traction member 40 may be employed, such as one having an open rectangular or triangular cross-sectional configuration having a bias so that the open legs of the triangle or rectangle are biased towards one another to tend to form a tubular element. Thus, traction devices can take the form of an elongate body which is split axially along one wall so that it does not form a complete tube. The bias should be sufficient so that the opposing inner surfaces 42 of the traction member 40 cooperatively engage the periphery of the recessed seat 30.

The traction member 40 may be formed by molding or extruding processes, as well known in the art. Preferably, the outer surface 42 is configured to enhance the coefficient of static friction between the eyewear and the head. The outer surface 44 may be formed to exhibit a variety of static friction coefficient enhancing configurations, such as a grid, waffle, or ribbed pattern (not shown). Typically, the outer surface 42 produced by extrusion will exhibit axially oriented patterns, while molded outer surfaces may exhibit axially and/or radially oriented patterns.

As discussed infra, the traction member 40 is preferably formed of an elastomeric material exhibiting sufficient flexibility or elasticity to allow the traction member 40 to expand while being slipped over the temple distal end 24 and to contract back within seat 30 after passing over the distal end.

In a particularly preferred embodiment, the traction member 40 is formed of a relatively soft elastomeric material having a coefficient of sliding friction that increases when the material is wetted. Such a material, sometimes referred to as hydrophilic, tends to enhance retention of the traction member 40 in position on the wearer's head as the wearer perspires or encounters moisture, as during skiing. One suitable material which can be readily molded by conventional techniques is marketed under the name KROTON G ™, a product of the Shell Oil Company.

The traction member 40 may comprise a resilient sponge-like elastomeric material, having a relatively high porosity, as shown in FIGS. 3 and 4. Alternatively, as shown in FIG. 6, the traction member 40 may comprise a substantially solid, i.e., fine or no porosity, yet flexible material. In addition, the traction member 40 may be made of materials having different densities, thereby providing traction members 40 having different weights, which may be employed to counterbalance lenses of differing weights, so as to distribute the weight of the eyewear 10 more evenly about the head.

The length of the traction member 40 is preferably no greater than and most preferably substantially equal to the distance between the anterior and posterior shoulders 32, 34. Although the traction member 40 is illustrated as extending roughly one-third or one-half the overall length of the temple, the traction members 40 within the present invention can extend anywhere from substantially the entire length of the temple 20 to only a relatively small portion thereof, as depending upon the configuration of the seat 30. Alternatively, a plurality of traction members 40 may be axially aligned within the seat 30. The traction members 40 may be selected so that a combined length of the members 40 substantially equals the distance between the anterior and the posterior shoulders 32, 34 or alternatively, the combined axial length of the members 40 may be such that an axial space separates adjacent traction members 40 within the seat.

In assembling the present invention, the traction member 40 is engaged with a temple 20 by passing the distal end 24 of the temple 20 through the tubular passageway within traction member 40. Alternatively, the temple 20 may be detached from the frame 12 or lens 14 and the proximal end 22 may be passed through the tubular passageway of the traction member 40. Therefore, the preferred construction of the traction member 40 which elastically passes over the distal end may be obviated. The traction member 40 is then moved along the temple 20 until the inner surface 42 engages the seat 30. In an embodiment in which the seat 30 has a length substantially equal to the length of the traction member 40, as the traction member 40 is received within the seat 30, further unintended motion along the temple 20 is prevented by engagement of the anterior and posterior shoulders 32, 34 with the traction member 40.

Alternatively, the seat 30 may have a sufficient axial length so as to retain a plurality of traction members 40 between the anterior and posterior shoulders 32, 34. The use of multiple traction members 40 allows for accommodating fashion considerations as well as high retaining forces for active uses, such as volleyball or basketball. Upon engagement of the traction member 40 within the seat 30, the outer surface 44 of the traction member 40 may be disposed outside of the periphery of the temple 20, as shown in FIG. 1 or, alternatively, may be substantially flush with the periphery 38 of the adjacent temple 20, as shown in FIG. 5. Traction members are preferably provided having a variety of wall thicknesses, i.e., the difference between R1 and R2. Thus, the wearer can select a flush fitting traction member as illustrated in FIG. 5 or a radially enlarged traction member as illustrated in FIG. 1, depending upon that wearer's perception of the need for enhanced traction or sleek appearance.

As the majority of the length of the temple 20 in the preferred embodiment is dominated by the periphery of the temple 20 rather than the seat 30, if the traction members 40 are removed from the temples 20, the fitting of the eyewear 10 will not be substantially denigrated. However, the length of the traction member 40, when engaged in the seat 30, provides a sufficient contact area to increase the resistance to movement of the eyewear 10 relative to the head.

This present invention has been described in detail in connection with the preferred embodiments, but these are examples only and the present invention is not restricted thereto. It will be easily understood by those skilled in the art that other variations and modifications can be easily made within the scope of this invention, which is defined by the following claims.

It is claimed:

1. Improved eyewear, comprising:
   at least one temple piece having a recessed seat along a length thereof such that the seat defines a periphery which is smaller than the periphery of the adjacent temple portion, said seat having an axial length of less than about one-half the axial length of the temple; and
   at least one substantially tubular traction member disposed within the recessed seat having an inner surface, an outer surface, and a central passageway running axially therethrough, said inner surface removably engaging the periphery of the seat, and said outer surface adapted to provide a contact surface with the head of the wearer.

2. Improved eyewear, comprising:
   a frame;
   at least one temple having proximal and distal ends and being joined to the frame at the proximal end thereof, having a recessed seat interposed between said proximal and distal ends, said seat having a smaller cross-sectional area than the cross-sectional area of said temple portion adjacent said seat, and said seat having an axial length of less than about one-half of the axial length of the temple; and
   a substantially tubular elastomeric traction member having an inner surface and an outer surface, such that the inner surface is adapted to circmferentially contact the temple, and the outer surface is adapted to engage the head of a wearer, wherein the traction member is disposed in the recessed seat region on the temple.

3. An improved eyewear temple for retaining eyeglasses on the head of the wearer and reducing abrasion caused by movement of said eyewear, comprising:
   an elongate eyewear temple body;
   a first end on the temple for attaching the temple to the frame of the eyeglasses;
   a second end on the temple, distal said first end, for engaging the head of the wearer; and
   a recessed seat interposed between said first and second ends having a smaller cross-sectional area than that of said temple portion adjacent said seat, said seat being separated from the remainder of said temple by first and second shoulders, such that the axial length of the recessed seat between the first and second shoulders is less than about one-half of the axial length of the temple, said recessed seat being situated toward the distal end of the temple such that at least one substantially tubular traction member removably disposed within the recessed seat can engage the head of the wearer.

4. An eyewear temple as in claim 3, wherein at least one substantially tubular traction member is disposed within the recessed seat between the first and second shoulders, said member having an inner surface, an outer surface, and a central passageway running axially therethrough, said inner surface removably engaging the periphery of the seat, and said outer surface adapted to provide a contact surface with the head of the wearer.

5. An eyewear temple as in claim 4, wherein the tubular traction member comprises a resilient elastomeric material.

6. An improved eyewear temple as in claim 5, wherein said elastomeric material exhibits a coefficient of sliding friction that increases when the material is wetted.

7. An eyewear temple as in claim 5, wherein the thickness of the traction member is such that the outer surface of the traction member is substantially flush with the periphery of the adjacent portion of the temple.

8. An eyewear temple as in claim 7, wherein the outer cross-sectional shape of the traction member approximates the outer cross-sectional shape of the adjacent portion of the temple.

9. An eyewear temple as in claim 5, wherein the traction member extends radially outward beyond the surface of the adjacent portion of the temple.

10. An eyewear temple as in claim 5, wherein at least one tubular traction member disposed within the recessed seat extends substantially the entire distance between said first and second shoulders of the temple.

11. An eyewear temple as in claim 5, wherein the traction member is removable and comprises a hollow, elastomeric member adapted to allow elastic radial expansion for sliding over the distal end of said temples and into engagement with said recessed seat.

12. An eyewear temple as in claim 3, wherein the shoulders extend substantially perpendicularly from the seat.

13. An eyewear temple as in claim 3, wherein the recessed seat consists of a tapering that extends axially and radially from the distal end of the recessed seat to the proximal end, wherein the cross-sectional area of the seat tapers from the smaller periphery at the distal end to being substantially coincident with the cross-sectional area of the temple at the proximal end of the recessed seat.

14. An eyewear temple as in claim 3, wherein the axial length of the recessed seat extends no more than about one-third the length of the temple.

15. An eyewear temple as in claim 3 further comprising an attachment means on the first end thereof for pivotably removably attaching the temple to an eyeglass frame.

16. An improved eyewear temple for retaining eyeglasses on the head of the wearer and reducing abrasion caused by movement of said eyewear, comprising:
an elongate eyewear temple body, wherein the body is substantially linear through the axial length of the temple;
a first end on the temple for attaching the temple to the frame of the eyeglasses;
a second end on the temple, distal said first end, for engaging the head of the wearer;
a recessed seat interposed between said first and second ends having a smaller cross-sectional area than that of said temple portion adjacent said seat, said seat being separated from the remainder of said temple by first and second shoulders; and
at least one tubular traction member disposed within the recessed seat.

17. An eyewear temple as in claim 16, wherein at least one substantially tubular traction member is disposed within the recessed seat between the first and second shoulders, said member having in inner surface, an outer surface, and a central passageway running axially therethrough, said inner surface removably engaging the periphery of the seat, and said outer surface adapted to provide a contact surface with the head of the wearer.

18. An eyewear temple as in claim 17, wherein the tubular traction member comprises a resilient elastomeric material.

19. An improved eyewear temple as in claim 18, wherein said elastomeric material exhibits a coefficient of sliding friction that increases when the material is wetted.

20. An eyewear temple as in claim 18, wherein the thickness of the traction member is such that the outer surface of the traction member is substantially flush with the periphery of the adjacent portion of the temple.

21. An eyewear temple as in claim 20, wherein the outer cross-sectional shape of the traction member approximates the outer cross-sectional shape of the adjacent portion of the temple.

22. An eyewear temple as in claim 18, wherein the traction member extends radially outward beyond the surface of the adjacent portion of the temple.

23. An eyewear temple as in claim 16, wherein the shoulders extend substantially perpendicularly from the seat.

24. An eyewear temple as in claim 16, wherein the recessed seat consists of a tapering that extends axially and radially from the distal end of the recessed seat to the proximal end, wherein the cross-sectional area of the seat tapers from the smaller periphery at the distal end to being substantially coincident with the cross-sectional area of the temple at the proximal end of the recessed seat.

25. An eyewear temple as in claim 16, wherein the axial length of the recessed seat extends no more than about one-third the length of the temple.

26. An eyewear temple as in claim 16, wherein the axial length of the recessed seat extends no more than about one-half the length of the temple.

27. An eyewear temple as in claim 16, wherein at least one tubular traction member disposed within the recessed seat extends substantially the entire distance between said first and second shoulders of the temple.

28. An eyewear temple as in claim 16, wherein the traction member is removable and comprises a hollow, elastomeric member adapted to allow elastic radial expansion for sliding over the distal end of said temples and into engagement with said recessed seat.

29. An eyewear temple as in claim 16, further comprising an attachment means on the first end thereof for pivotably removably attaching the temple to an eyeglass frame.

30. Improved eyewear, comprising:
at least one temple piece being substantially linear throughout the axial length of the temple and having a recessed seat along a length thereof such that the seat defines a periphery which is smaller than the periphery of the adjacent temple portion; and
at least one substantially tubular traction member disposed within the recessed seat having an inner surface, an outer surface, and a central passageway running axially therethrough said inner surface removably engaging the periphery of the seat, and said outer surface adapted to provide a contact surface with the head of the wearer.

31. Improved eyewear, comprising:
a frame;
at least one temple having proximal and distal ends and being joined to the frame at the proximal end thereof, said temple being substantially linear throughout the axial length of the temple, said temple having a recessed seat interposed between said proximal and distal ends, said seat having a smaller cross-sectional area than that of said temple portion adjacent said seat; and
a substantially tubular elastomeric traction member having an inner surface and an outer surface, such that the inner surface is adapted to circumferentially contact the temple, and the outer surface is adapted to engage the head of a wearer, wherein the traction member is disposed in the recessed seat region on the temple.

32. Improved eyewear having a lens, a frame supporting said lens for positioning the lens before the eyes of a wearer, and first and second temples for securing said eyewear to the head of the wearer, said temples having a proximal end joined to said frame and a distal end spaced from said proximal end, the improvement comprising:
said first and second temples being substantially linear throughout the axial length of the temple member, said temples having disposed between said proximal and distal ends a radially recessed seat having a smaller cross-sectional area than that of said temple portion adjacent said seat; and
at least one traction member releasably secured on said first and second temples within the seat, whereby said traction member frictionally engages the wearer's head.

* * * * *